United States Patent [19]

Kroplinski et al.

[11] 4,267,044
[45] May 12, 1981

[54] THIXOTROPIC POLYURETHANE COMPOSITIONS AS SEALANTS FOR MEMBRANE SEPARATORY DEVICES

[75] Inventors: Thaddeus F. Kroplinski, Bound Brook; Barton C. Case, Howell, both of N.J.

[73] Assignee: NL Industries, Inc., New York, N.Y.

[21] Appl. No.: 894,845

[22] Filed: Apr. 10, 1978

[51] Int. Cl.³ .......................................... B01D 31/00
[52] U.S. Cl. ............................. 210/321.2; 210/493.5
[58] Field of Search ............. 260/18 TH; 528/76, 78; 210/321 B, 321 R, 321 A, 500 M, 493 M; 422/48

[56] References Cited

U.S. PATENT DOCUMENTS

| 3,923,926 | 12/1975 | Harada et al. | 528/78 X |
| 3,979,364 | 9/1976 | Rowton | 528/76 |
| 4,028,252 | 7/1977 | Morris | 210/493 M X |
| 4,116,841 | 9/1978 | Borsanyl | 210/493 M X |
| 4,163,721 | 8/1979 | Lobdell | 210/321 B X |
| 4,170,559 | 10/1979 | Kroplinski et al. | 210/321 A |

Primary Examiner—Frank A. Spear, Jr.
Attorney, Agent, or Firm—Gary M. Nath

[57] ABSTRACT

Novel thixotropic polyurethane compositions particularly useful as sealants for the edges of folded membrane separatory devices are provided which comprise;
 (a) a prepolymer comprising the reaction product of a polyol having a hydroxyl functionality of at least 2 with one mole per hydroxy group of said polyol of an organic diisocyanate; and
 (b) a crosslinking agent comprising a polyether polyol having a hydroxyl functionality of at least 2 and a primary amine-terminated polyether having an amine functionality of at least 2.

To accelerate curing of the composition, the crosslinking agent can be modified by employing primary hydroxyl-terminated polyethers and/or adding hydroxyl-containing tertiary amines.

12 Claims, 1 Drawing Figure

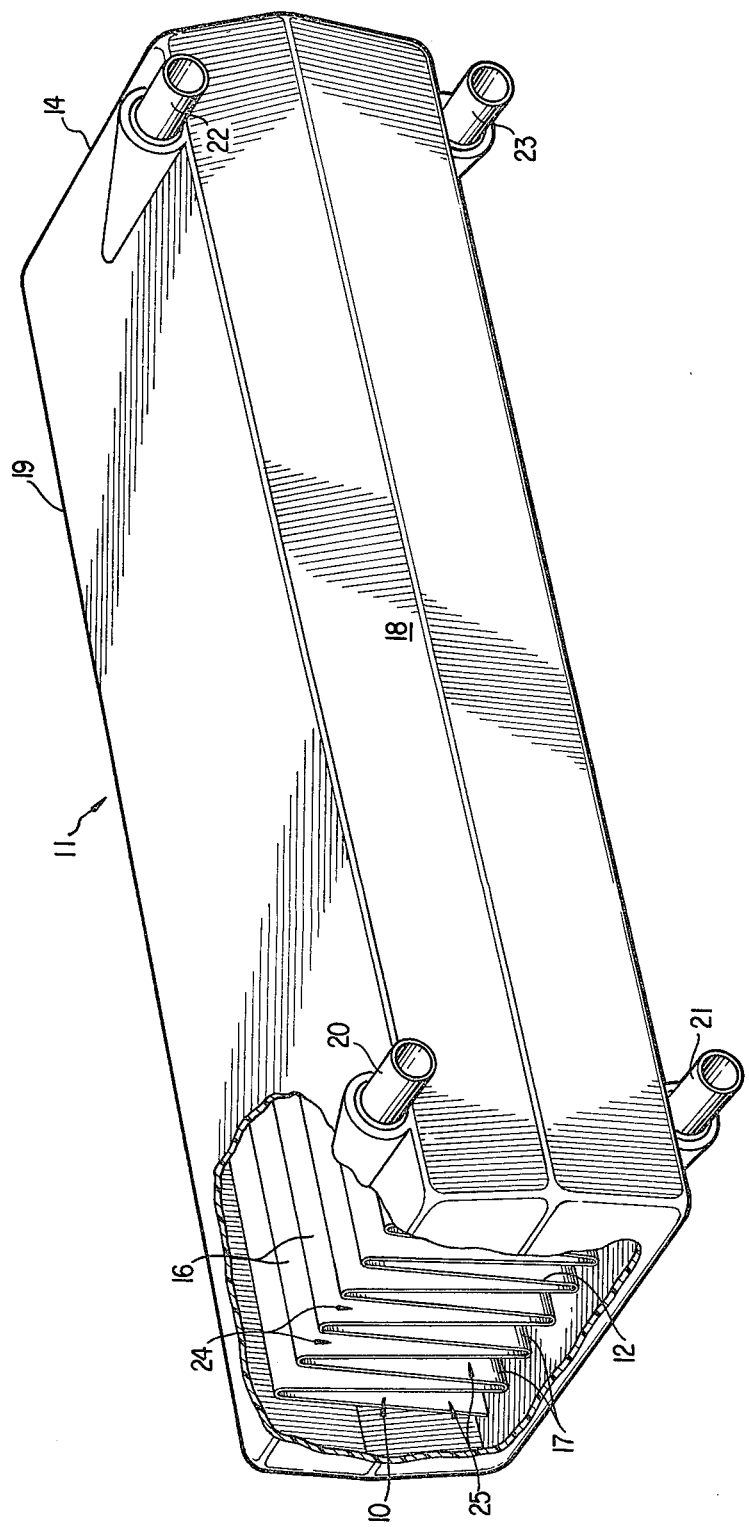

THIXOTROPIC POLYURETHANE COMPOSITIONS AS SEALANTS FOR MEMBRANE SEPARATORY DEVICES

This invention is concerned with thixotropic polyurethane compositions useful as sealants for membrane separatory devices, particularly folded membrane artificial kidneys.

In the past, polyurethane compositions based on an isocyanate-terminated prepolymer comprising the reaction product of a polyol and a polyisocyanate cured with one or more polyfunctional crosslinking agents have been described in the art. Of particular concern herein are polyurethanes based on prepolymers comprising the reaction product of long chain fatty acid esters such as castor oil with organic polyisocyanates.

For example, in U.S. Pat. No. 3,362,921 to Arthur Ehrlich et al, curing agents for prepolymers based on the reaction product of active hydrogen-containing compounds such as castor oil, polyester amides and polyalkylene ether glycols with organic diisocyanates are described which agents comprise esters of polyhydric alcohols containing at least four hydroxy groups and an aliphatic acid having at least 12 carbon atoms and one or more hydroxy and/or epoxy groups. The cured polyurethanes find use as floccing adhesives, paper coatings, potting compositions and encapsulating compounds for electronic parts.

In U.S. Pat. No. 3,483,150 to Ehrlich et al, prepolymer compositions are described comprising the reaction product of at least one polyfunctional compound containing active hydrogens with an arylene diisocyanate and a low viscosity or solid polyfunctional isocyanate derived from the reaction of aniline and formaldehyde and having a functionality of between 2 and 3. The prepolymers are cured to elastomers by adding to the prepolymer at least one curing agent comprising a material containing two or more active hydrogen groups. Such curing agents include the curing agent of U.S. Pat. No. 3,362,921 and in addition, a glycol, glyceryl, polyglycol, or polyalkylene glycol mono- or di-ester of a hydroxy carboxylic acid having at least 12 carbon atoms. Certain amines are useful in curing the prepolymers and include primary and secondary aliphatic, cyclic, aromatic, aralkyl and alkaryl diamines.

In U.S. Pat. No. 3,962,094 to J. C. Davis, a hollow fiber separatory device useful for dialysis, ultra-filtration, reverse osmosis, hemodialysis, etc., is provided consisting of a plurality of fine, hollow fibers whose end portions are potted in a tube sheet and whose open fiber ends terminate in a tube sheet face which provides liquid access to the interior of the fibers. The tube sheet comprises a cured polyurethane consisting essentially of a prepolymer based on the reaction product of castor oil with at least one mole per castor oil hydroxy group of an organic diisocyanate and crosslinked with either castor oil or an ester of polyhydric alcohol of hydroxyl functionality 4 or more and an organic acid containing at least 12 carbon atoms and one or more hydroxy and/or epoxy groups per molecule, or mixtures of castor oil and the above-named ester.

In addition to hollow fiber separatory devices, folded membrane separatory devices have also been used in chemical separations such as dialysis, osmotic processes and hemodialysis. In a folded membrane artificial kidney for example, a membrane sheet is multiply-folded or pleated to form a series of adjacent channels, each channel located between opposing faces of each fold. The edges of the folds in the membrane are sealed together by potting the edges in a sealant. The membrane is then placed in a case usually comprised of polystyrene, a styrene-acrylonitrile copolymer or a polycarbonate polymer wherein the chemical separation takes place. In the case of dialysis, the dialysis solution is placed on one side of the membrane and blood is placed on the other side. Polyepoxides and polyurethanes have generally been used to seal the edges of folded membranes. However, these materials are generally unsatisfactory because of their poor adhesion to the case, high shrinkage, and tendency to wick or flow into the channels of the folded membrane.

The present invention, on the other hand, provides novel thixotropic polyurethane compositions useful as sealants for folded membrane separatory devices, particularly folded membrane artificial kidneys, which comprise a prepolymer based on the reaction product of a polyol such as castor oil or other ricinoleic acid polyol ester or polyether-castor oil mixtures with an organic diisocyanate, crosslinked with an agent comprising a polyether polyol having a hydroxyl functionality of at least 2 and a primary amine-terminated polyether having an amine functionality of at least 2. The present compositions are easy to apply to the edges of the membrane and exhibit an unexpected degree of adhesion. Furthermore, due to their thixotropic properties, they do not wick or flow into the membrane channels.

SUMMARY OF THE INVENTION

In one embodiment of this invention a novel thixotropic polyurethane composition is provided comprising;

(a) a prepolymer comprising the reaction product of a polyol having a hydroxyl functionality of at least 2 with at least one mole per hydroxy group of said polyol of an organic diisocyanate; and (b) a crosslinking agent comprising a polyether polyol having a hydroxyl functionality of at least 2 and a primary amine-terminated polyether having an amine functionality of at least 2.

In another embodiment of this invention, a folded membrane separatory device is provided comprising a case, a folded membrane located within said case having a plurality of folds and a series of adjacent channels formed between said folds, the edge portions of each fold being sealed with the above-described polyurethane in the cured state.

Thixotropy develops almost instantly on forming the polyurethane compositions of this invention. However, to accelerate curing, the crosslinking agent can be modified by employing primary hydroxyl terminated polyethers and/or adding hydroxyl-containing tertiary amines.

DETAILED DESCRIPTION OF THE PREFERRED EMBODIMENTS

The polyols used to prepare the prepolymers of the present invention have hydroxyl functionalities of at least 2 and include esters of hydroxy carboxylic acids having at least 12 carbon atoms, polyether polyols having molecular weights of from 200 to 2000 and mixtures thereof. Hydroxyl or amine functionality as used herein is the average number of hydroxyl or amine groups per molecule of compound.

The esters are preferably ricinoleic acid polyol esters and more preferably castor oil. Castor oil is a naturally-occurring triglyceride of ricinoleic acid. Castor oil is actually a mixture of mono-, di, and triglyercides and has an average hydroxyl functionality of 2.7. Other ricinoleic acid polyol esters include glycol, polyglycol and other polyhydric alcohol mono-, di-, and polyesters of ricinoleic acid. These ricinoleic acid polyol esters can be made by methods well known in the art, e.g. by direct esterification of ricinoleic acid with alcohols such as ethylene glycol, glycerine, propylene glycol, hexylene glycol, diethylene glycol, dipropylene glycol, hexamethylene glycol, polyethylene and polypropylene glycols, sucrose or sorbitol.

The preferred polyether polyols are polyether diols, and more particularly polyoxypropylene diols. Preferred molecular weights for the polyether diols range from about 300 to about 600 and more preferably from about 400 to 500. Generally, these polyether diols are prepared by condensing a large excess of an alkylene oxide such as ethylene oxide or propylene oxide with a glycol, as well known in the art. The glycol can be a diol such as alkylene glycols, e.g., ethylene glycol or propylene glycol, a triol such as glycerine, a tetrol such as pentaerythritol, etc. A particularly preferred polyol for this invention comprises a mixture of castor oil and a polyoxypropylene diol, e.g. one having molecular weight of about 400.

The organic diisocyanates used in the preparation of the prepolymers of this invention are well known in the art. Arylene diisocyanates, represented by the diisocyanates of the benzene and napthalene series, or mixtures of these compounds, are preferred. Illustrative of arylene diisocyanates that can be employed are the following: tolylene diisocyanate (2,4/2,6), toluene-2,4, diisocyanate, toluene-2,6-diisocyanate, m-phenylene diisocyanate, xenylene, 4,4'-diisocyanate, napthalene-1,5' diisocyanate, 3,3'-bitolylene-4,4'-diisocyanate, diphenylene methane-4,4'-diisocyanate (MDI), 4-chlorophenylene-2,4'-diisocyanate, dianisidine diisocyanate, diphenylene ether 4,4'-diisocyanate, and polymeric isocyanates such as polymethylene polyphenylene isocyanate. Other arylene diisocyanates which are useful include lower alkyl-substituted derivatives and alkoxy-substituted derivatives. Aliphatic and cycloaliphatic diisocyanates, such as isophrone diisocyanate (IPDI), can also be employed. Mixtures of arylene and aliphatic, or cycloaliphatic diisocyanates can be used in the systems of this invention.

The amount of organic diisocyanate reacted with the polyol should be sufficient to provide at least one mole of diisocyanate per hydroxy group of polyol. An NCO/OH ratio of above about 2:1, and preferably about 3:1, and up to about 7:1 or more is desirable. The preferred range is about 4 or 5:1 to insure the formation of an isocyanate-terminated prepolymer which is capable of further reaction with the crosslinking agent.

The crosslinking agent of this invention includes a polyether polyol and a primary amine-terminated polyether. The polyether polyol component is a hydroxyl-terminated polyether having a hydroxyl functionality of at least 2 and preferably 3 or 4, or more. The crosslinking polyether polyols can be prepared as the polyether polyols were prepared above for the prepolymers of this invention. The preferred polyether polyol components have molecular weights of between about 1000 and 4000, and more preferably about 3000 and a hydroxyl functionality of about 3 or 4. The polyether polyols can be secondary hydroxyl-terminated or primary hydroxyl-terminated. However, in order to accelerate the rate of curing, it is preferred that primary hydroxyl-terminated polyethers be employed, i.e. about 40 to 100% of the hydroxyl groups are primary groups. These can be obtained from conventional secondary hydroxyl-terminated polyethers by end-capping the secondary hydroxyl groups with ethylene oxide.

The primary amine-terminated polyether component of the crosslinking agent is preferably a polyoxypropylene amine having a molecular weight from about 100, or 200, to preferably about 500, although molecular weights up to about 2000 are suitable, and an amine functionality of about 2 to 3, preferably about 2. Such primary amine-terminated polyethers are manufactured and sold by the Jefferson Chemical Company of Houston, Texas under the name "JEFFAMINE". Particularly preferred is Jeffamine D-230 which is a polyoxypropylene glycol terminated with primary amines and having an amine functionality of 2 and a molecular weight of about 230.

In general, the cross-linking agent contains about 75 to 99%, preferably 84 to 92%, of the polyether polyol with the balance being the polyamine. It is desired to provide sufficient polyamine to provide the desired thixotropy and about 1 to about 10 wt.%, preferably 1 to 2.5 weight %, of the cross-linking agent is polyamine. The cross-linking agent is reacted with the prepolymer in an amount sufficient to obtain an NCO:OH and amine equivalent ratio of about 1 to 1.1:1. Typically, the curable urethane compositions of this invention contain about 40 to 80 wt.%, preferably about 60 to 70 wt.%, cross-linking agent with the essential remainder being the prepolymer.

Crosslinking of the system of this invention can be further accelerated by adding to the crosslinking agent a hydroxyl-containing tertiary amine such as diisopropanol amine or QUADROL (sold by BASF Wyandotte Corp.), i.e. N,N,N$^1$,N$^1$-tetrakis(2-hydroxypropyl) ethylene diamine. If desired, the reaction can be slowed and a product having the same physical properties produced by adding a polyether tetrol such as PEP450 of BASF Wyandotte Corp. The amount of these materials is typically the amount required to give the cure time desired for the urethane system. In general, the curable urethane system can contain up to about 10 wt.% of these materials without adversely affecting the ultimate properties of the cured compositions; however, typically less than about 8 wt.% of the composition comprise one of these materials.

The FIGURE which schematically illustrates a folded kidney device serves to further illustrate the present invention.

As shown by this FIGURE a semipermeable channel membrane 10, such as one made of cuprophane, is utilized to manufacture a folded kidney device 11. The semi-permeable channel membrane 10 is folded many times. The ends 12 and 14 of membrane 10 are potted with one of the commercially available urethane systems. The tops and bottom, or folds, 16 and 17 respectively, of membrane 10 are coated with a thixotropic urethane system in accordance with the present invention. The sides, 18 and 19 are also optionally coated. Ends 12 and 14 can be potted with the system of the present invention, if desired. Intake blood port 20 and exit blood port 22 have free access to the blood chambers 24 in the channel membrane 10. Intake dialysate port 21 and exit dialysate port 23 have free access to the dialysate chambers 25 in channel membrane 10.

The following examples serve to further illustrate the invention.

EXAMPLE 1

A polyurethane composition was prepared comprising a prepolymer based on the reaction product of a polyol consisting of a mixture of castor oil and a polypropylene glycol diol with diphenylene methane-4,4'-diisocyanate and a cross-linking agent comprising a primary hydroxyl-terminated polyether, a primary amine-terminated polyether and a hydroxyl-containing tertiary amine. The composition was applied to the edges of a folded membrane separatory device as illustrated in the FIGURE.

The prepolymer was prepared by first reacting about 6.36 equivalents of the diisocyanate with 0.966 equivalents of polypropylene glycol diol having a molecular weight of about 400, pluracol P-410 sold by BASF Wyandotte Corp. To 83.0 g. of this product was added 17.0 g. of castor oil at 60 deg. C. with stirring to form the prepolymer (NCO/OH=4.06/1). 38.0 g. of this prepolymer was added to 62.0 g. of a crosslinking agent comprising a mixture of:

(a) Voranol 4301 triol, a polyoxypropylene triol having a molecular weight of about 3000, end-capped with ethylene oxide to insure primary hydroxyl functionality with about 60% primary hydroxyl groups, hydroxyl functionality of 3, sold by Dow Chemical Company (88.65 wt.%);

(b) N,N,N,N,-tetrakis-(2-hydroxy propyl) ethylene diamine. (7.58 wt.%);

(c) Jeffamine D-230, a primary amine-terminated polyoxypropyleneamine, amine functionality 2; 230 M.W., sold by Jefferson Chemical Co. (3.77 wt.%).

Thixotropy developed almost immediately upon mixing the prepolymer and crosslinking agent. To illustrate the thixotropy of the system, 150 g. samples were subjected to increasing shear using a Brookfield viscosity device, No. 6 and 7 spindle. The RPM and viscosity data of the following Table demonstrates thixotropy. The mixed system is shear sensitive, thinning with increasing shear.

TABLE

| RPM | VISCOSITY #7 SPINDLE | #6 SPINDLE |
|---|---|---|
| 100 | 20,800 | >10,000 |
| 50 | 27,200 | >20,000 |
| 20 | 40,000 | 32,500 |
| 10 | 60,000 | 47,000 |
| 5 | 96,000 | 74,000 |
| 2.5 | 160,000 | 120,000 |
| 1 | 320,000 | 250,000 |

The composition was applied to the edges of the folded membrane useful as an artificial kidney and allowed to cure. Gel time was 20 minutes at 25° C. Adhesion was excellent and there was no wicking or flowing of the composition into the channels of the artificial kidney. Curing was uniform without puddling.

EXAMPLE 2

A polyurethane composition was prepared comprising the prepolymer of Example 1 and a crosslinking agent comprising a mixture of:

(a) Voranol 4301, a polyoxypropylene triol having a molecular weight of about 3000 and having 60% thereof end-capped with ethylene oxide sold by Dow Chemical Company (86.16 wt.%);

(b) a polyether tetrol (PEP 450 of BASF Wyandotte Corp.) hydroxyl functionality of 4 and molecular weight of 400 (10.16 wt.%);

(c) Jeffamine D-230, a primary amine-terminated polyoxypropylene glycol 230 M.W. sold by Jefferson Chemical Co. (3.68 wt.%).

37.3 g. of the prepolymer was added to 62.7 g. of the crosslinking agent. The composition developed thixotropy almost immediately after addition was complete. A portion was applied to the edges of a folded membrane artificial kidney as in Example 1. Gel time was 350 minutes at 25° C. No wicking or bleeding of the applied composition into the channels of the artificial kidney was evident. This system gave a long working life.

EXAMPLE 3

204 grams of Pluracol P-410, sold by BASF Wyandotte Corp., a 400 MW polyoxypropylene glycol (0.966 eq.) (16.94% wt.), 205 grams of castor oil (0.599 eq.) (17.03% wt.), 614 grams MDI (4.912 eq.) (51.0% wt.) and 181 grams IPDI (1.629 eq.) (15.03% wt.) were reacted to produce a prepolymer having an NCO/OH ratio of 4.18/1. 35.3 grams of this prepolymer were reacted with 64.7 grams of a polyol containing 393.7 grams of Voranol 4301, sold by Dow Chemical Company, a 3000 MW polyether triol (0.4 eq.), 33.5 grams of QUADROL, sold by, BASF Wyandotte Corp., N,N,N$^1$,N$^1$-tetrakis(2-hydroxypropyl)ethylene diamine (0.46 eq.), 168 grams of Jeffamine D-230, sold by Jefferson Chemical Co., a primary amine terminated 230 MW polyether (0.14 eq.). This system produced a thixotropic mixture which gelled in 22 minutes at 25° C.

EXAMPLE 4

Additional thixotropic systems were prepared using the prepolymer of Example 1, and others, and various polyols to produce systems having different properties.

Using the prepolymer of Example 1, Polyols A and B, described below, were used to prepare thick thixotropic system having essentially the same gel time as Example 1. Polyols C and D were used to provide a slower curing system. The use of Polyol E produces a slow curing, non-freezing thixotropic system. Polyol F provides a low viscosity slower curing system and Polyol G provides a high viscosity, slower curing system.

POLYOL A—359.1 gm. of Voranol 4301, a 3000 MW polyether triol end-capped with ethylene oxide (0.37 eq.), 33.5 gm. of Quadrol, N,N,N$^1$,N$^1$-tetrakis (2-hydroxypropyl) ethylene diamine (0.46 eq.), 20.4 gm of Jeffamine D-230, a 230 MW amine terminated polyether polyol (0.17).

POLYOL B—378.5 gm of Voranol 4301, (0.39 eq.), 33.5 gm QUADROL (0.46 eq.), and 18 gm of Jeffamine D-230 (0.15 eq.).

POLYOL C—452.7 gm Voranol 4301 (0.46 eq.), 29.1 gm QUADROL (0.40 eq.), 16.8 gm Jeffamine D-230 (0.14 eq.).

POLYOL D—492.1 gm Voranol 4301 (0.5 eq.), 26.2 gm QUADROL and 16.8 gm Jeffamine D-230 (0.14 eq).

POLYOL E—383.8 gm Voranol 4301 (0.39 eq.), 19.2 gm Jeffamine D-230 (0.16 eq.) and 45.4 gm PEP450 (0.45 eq.).

POLYOL F—413.3 gm Voranol 4301 (0.42 eq.) 12.0 gm Jeffamine D-230 (0.1 eq.) and 49.4 gm PEP450 (0.48 eq.).

POLYOL G—354.2 gm Voranol 4301 (0.36 eq.) 26.4 gm Jeffamine D-230 (0.22 eq.) and 42.4 gm PEP450 (0.42 eq.).

PREPOLYMER Example 4—Prepolymer was prepared by first reacting about 6.36 eg of 4,4' diphenyl diisocyanate with 0.966 equivalents of polypropylene glycol diol (Pluracol P-410) having a molecular wt. of about 400. To 91.45 gm of this product was added 8.55 gm of castor oil at 60° C. with stirring to form the prepolymer. NCO/OH ratio 5.17/1.

The following table provides comparative data on the systems described.

TABLE

| System Prepolymer/Polyol | Prepolymer to Polyol Mix Ratio | Mix Visc. (CPS) | 90 gm. Gel Time at R.T. (Minutes) | Shore A/10 Sec |
|---|---|---|---|---|
| Example 1 | 38/62 | 90,000 | 20 | 70/65 |
| Example 2 | 37.3/62.7 | 85,000 | 350 | 70/68 |
| Example 3 | 35.3/64.7 | 88,000 | 22 | 70/65 |
| Ex. 1/A | 39.7/60.3 | 1,000,000 | 15 | 75/67 |
| Ex. 1/B | 38.7/61.3 | 320,000 | 19 | 71/64 |
| Ex. 1/C | 34.9/65.1 | 95,000 | 55 | 67/65 |
| Ex. 1/D | 33.3/66.7 | 95,000 | 95 | 65/64 |
| Ex. 4/E | 34.9/65.1 | 64,200 | 300 | 72/68 |
| Ex. 4/F | 33.6/66.4 | 24,000 | 320 | 71/68 |
| Ex. 4/G | 36.2/63.8 | 194,000 | 200 | 73/68 |

It is claimed:

1. A folded membrane separatory device capable of use in a biomedical application comprising:
   (a) a case:
   (b) a membrane located within said case and comprising a plurality of folds which form a series of adjacent channels between said folds, the edge portions of each fold being sealed with a polyurethane composition comprising the cured composition of a curable nonflowing thixotropic polyurethane composition comprising:
   (1) about 60% to about 20% of a prepolymer comprising the reaction product of a polyol having a hydroxyl functionality of at least 2 with at least one mole per hydroxy group of said polyol of an organic diisocyanate; and
   (2) about 40% to about 80% of a crosslinking agent comprising about 75% to about 99% of a polyether polyol having a hydroxyl functionality of at least 2 and the remaining amount of cross-linking agent being a primary amine-terminated polyether having an amine functionality of at least 2.

2. The composition of claim 1 wherein said polyol in the prepolymer is selected from the group consisting of castor oil, a polyol ester of a hydroxy carboxylic acid having at least 12 carbon atoms, a polyether polyol having a molecular weight of from about 200 to 2000 and mixtures thereof.

3. The composition of claim 1 wherein said diisocyanate is selected from the group consisting of arylene diisocyanates and mixtures thereof with aliphatic diisocyanates.

4. The composition of claim 1 wherein said polyether polyol in the crosslinking agent has a molecular weight of from about 1000 to 4000.

5. The composition of claim 1 wherein said primary amine-terminated polyether is a polyoxypropylene glycol polyamine having a molecular weight of from about 200 to 500.

6. The composition of claim 1 wherein said crosslinking agent further includes a hydroxyl-containing tertiary amine.

7. A folded membrane separatory device capable of use in a biomedical application comprising:
   (a) a case comprised of a polymeric material selected from the group consisting of polystyrene, styreneacrylonitrile copolymers and polycarbonates;
   (b) a membrane located within said case having a plurality of folds and a series of adjacent channels formed between said folds, the edge portions of each fold being sealed with the cured polyurethane composition of a curable nonflowing thixotropic polyurethane composition comprising:
   (1) about 60% to about 20% of a prepolymer comprising the reaction product of a polyol having a hydroxyl functionality of at least 2 and selected from the group consisting of castor oil, a polyol ester of a hydroxy carboxylic acid having at least 12 carbon atoms, a polyether polyol having a molecular weight of from about 200 to 2000 and mixtures thereof with at least one mole per hydroxy group of said polyol of an arylene diisocyanate and;
   (2) about 40% to about 80% of a crosslinking agent comprising (1) about 75% to about 99% of a polyether polyol having a hydroxyl functionality of at least 2 and a molecular weight of from about 1000 to 4000, above about 40% of the hydroxyl groups of said polyol being terminal and primary; (2) about 1% to about 10% of a polyoxypropylene glycol polyamine having a molecular weight of from about 200 to 500 and an amine functionality of at least 2; and (3) up to about 10% of $N,N,N^1,N^1$,-tetrakis(2-hydroxypropyl)ethylene diamine or diisopropanol amine.

8. The composition of claim 7 wherein said polyol ester is castor oil.

9. The composition of claim 7 wherein said polyether polyol in the prepolymer is a polyether diol having a molecular weight of about 400.

10. The composition of claim 7 wherein said polyether polyol in the crosslinking agent is a polyoxypropylenetriol having a molecular weight of about 3000 and being end-capped with ethylene oxide to provide approximately 60% primary hydroxyl groups.

11. The composition of claim 7 wherein said crosslinking agent further includes a polyether tetrol.

12. A folded membrane artificial kidney comprising:
   (a) a case comprised of a polymeric material selected from the group consisting of polystyrene, styreneacrylonitrile copolymers and polycarbonates;
   (b) a membrane located within said case having a plurality of folds and a series of adjacent channels formed between said folds, the edge portions of each fold being sealed with the polyurethane composition of a curable nonflowing thixotropic polyurethane composition comprising:
   (1) about 60% to about 20% of a prepolymer comprising the reaction product of a polyol consisting of a mixture of castor oil and a polyether diol having a molecular weight of about 400 with at least one mole per hydroxy group of said polyol of an arylene diisocyanate; and
   (2) about 40% to about 80% of a crosslinking agent comprising a mixture of (1) about 75% to about 99% of a polyoxypropylene triol having a molecular weight of about 3000 and being end-capped with ethylene oxide to provide above about 40% primary hydroxyl groups or a polyether tetrol; (2) about 1% to about 10% of a polyoxypropylene glycol polyamine having a molecular weight of about 230; and (3) up to about 10% of $N,N,N^1,N^1$,-tetrakis(2-hydroxypropyl)ethylene diamine or diisopropanol amine.

* * * * *